United States Patent [19]
Bruce et al.

[11] 3,746,366
[45] July 17, 1973

[54] FLEXIBLE TRAILER SPLASH AND STONE SHIELD

[76] Inventors: Lester E. Bruce, 2356 Bradner South R.R. 2, Aldergrove, British Columbia; Allan L. Bruce, 21915 Fraser Highway, Langley, British Columbia, both of Canada

[22] Filed: Apr. 10, 1972
[21] Appl. No.: 242,614

[52] U.S. Cl............. 280/154.5 R, 280/505, 293/69
[51] Int. Cl.. B60m 27/00, B62d 25/18, B62d 65/00
[58] Field of Search....................... 280/154.5, 505; 293/69; 298/1 SG

[56] References Cited
UNITED STATES PATENTS
2,640,714  6/1953  Garner, et al............... 280/154.5 R
2,865,655  12/1958  Boysen....................... 280/154.5 R
3,058,757  10/1962  Sullivan...................... 280/154.5 R

*Primary Examiner*—Gerald M. Forlenza
*Assistant Examiner*—Howard Beltran
*Attorney*—Kellard A. Carter

[57] ABSTRACT

A shield assembly is disclosed in which a pair of shield members are pivoted in a bracket mounted on the trailer frame for movement between rearward and forward positions, the shield members normally being biased into the forward position by springs. In alternative arrangements purposed, the shield members are mounted on connecting rods biased forwardly in a cylinder or cylinders by coil springs.

11 Claims, 6 Drawing Figures

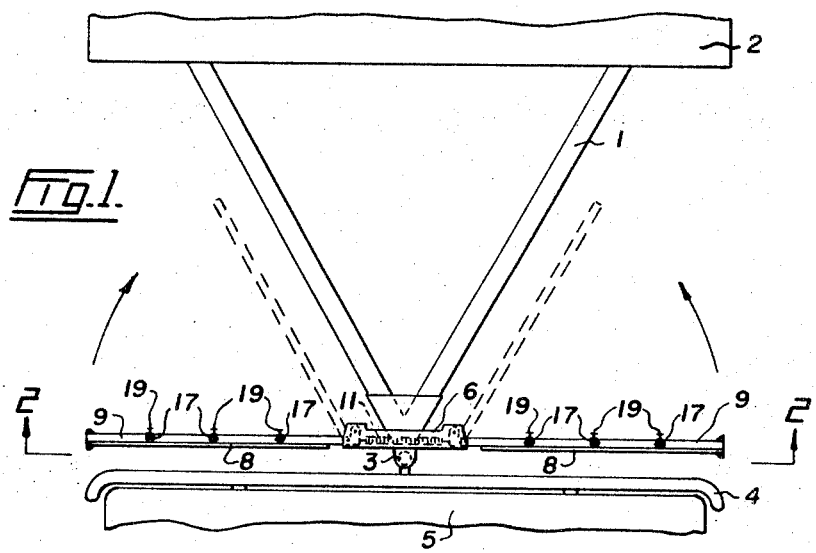
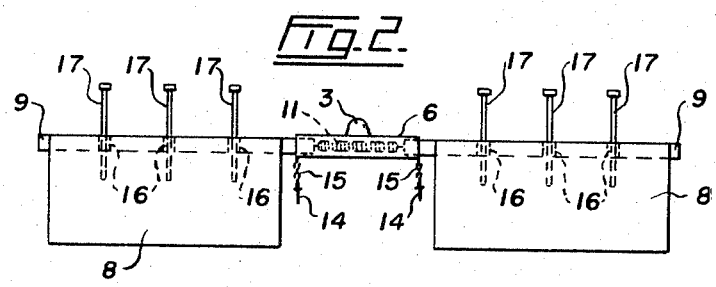
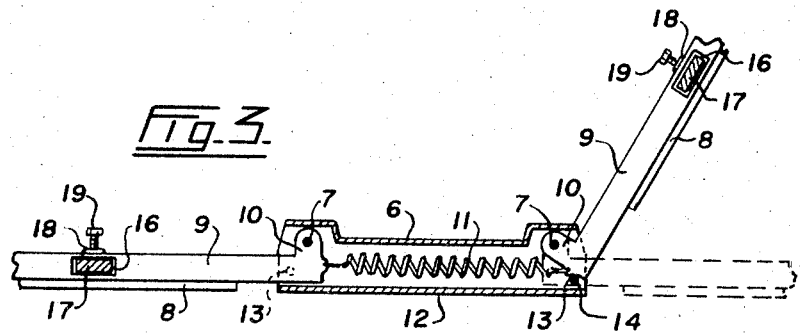

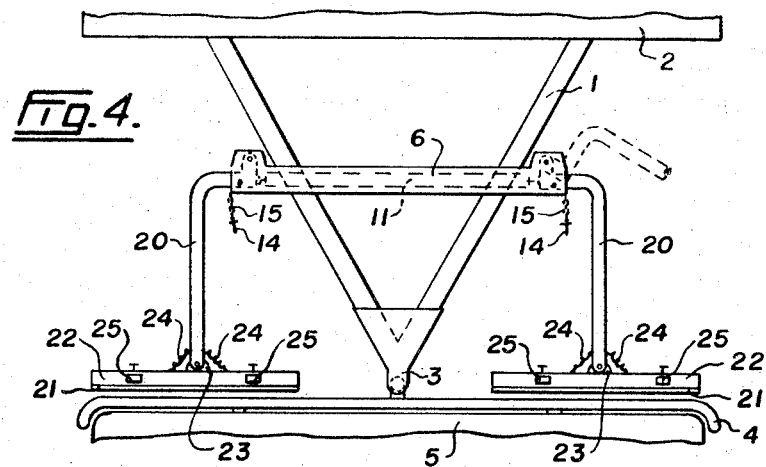
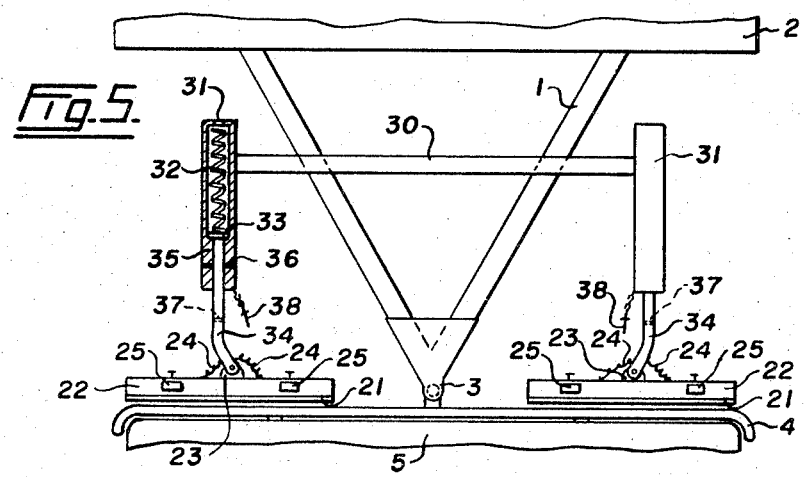
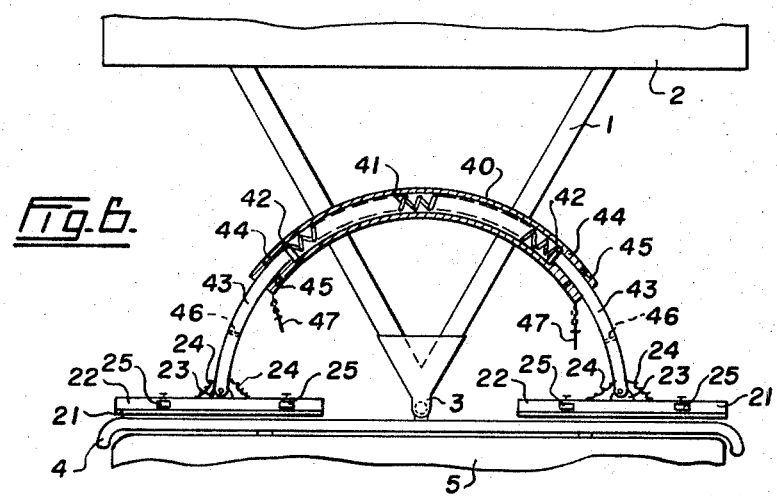

FLEXIBLE TRAILER SPLASH AND STONE SHIELD

The invention relates to a splash and stone guard assembly for a trailer body.

The invention provides a splash and stone shield assembly for a trailer body, comprising at least one shield member, support means for mounting the or each shield member on a frame portion of the trailer forwardly of the trailer body and for movement relative to the trailer between a rearward retracted position and a forward shielding position and resilient means for normally urging the or each shield member into the forward position.

Various embodiments of this invention will now be described with reference to the accompanying drawings in which, FIG. 1 is a plan view of the front end of a trailer incorporating a shield assembly according to the invention, FIG. 2 is an elevation on the line 2—2 of FIG. 1, FIG. 3 is a plan view in greater detail of the central portion of the shield assembly, FIG. 4 is a plan view of the front end of a trailer incorporating a modified version of the shield assembly shown in FIGS. 1 to 3, FIG. 5 is a plan view of the front end of a trailer showing an alternative form of shield assembly according to the invention and, FIG. 6 is a plan view of the front end of a trailer showing a further alternative shield assembly according to the invention.

Referring first to FIGS. 1 to 3, a trailer frame 1 carries a trailer body 2 and at the front end is connected by a ball hitch 3 to the bumper 4 of an automobile 5.

Immediately to the rear of the ball hitch 3, a transversely extending support bracket 6 is secured on the frame 1. At each end, the support bracket 6 is provided with journal pins 7 (see FIG. 3). A pair of shield plates 8 are mounted on horizontal support arms 9 fabricated from square section tubing. At their inner ends, the arms 9 are provided with lugs 10 extending at right angles therefrom and journalled on the pins 7. A coil spring 11 extends along the bracket 6 and is secured at its ends between the inner ends of the arms 9 at positions forward of the pins 7. The bracket 6 is generally of box-section and the front wall 12 thereof defines stop surfaces at each end against which the arms 9 are drawn into engagement by the action of the spring 11. The upper and lower walls of the bracket 6 are also apertured at each end at 13 to receive retaining pins 14 conveniently secured to the bracket by chains 15 (see FIG. 2). The pins 14 can be engaged in the apertures 13 to retain the arms 9 in a rearward position against the bias of the spring 11 as best seen at the right hand side of FIG. 3.

At intervals along the square section tubes forming the arms 9, aligned rectangular apertures are provided in the upper and lower faces through which vertically movable bumper contact members 17 extend. The rear walls of the arms 9 are provided with bushes 18 aligned with the apertures 16. At each bush 18, a threaded bolt 19 engages a threaded bore extending through the bush 18 and rear wall to clamp the corresponding bumper contact member in a desired position.

It will be seen that in use, when the automobile 5 is making a turn with the trailer in tow, the bumper 4 of the automobile will bear against the bumper contact members (which are preadjusted to an appropriate height) and swing the shield member comprised by the arm 9 and shield plates 8 rearwardly against the bias of the spring 11 to the dotted line position shown in FIG. 1 on the side to which the turn is being made. As the turn is completed and the vehicle and trailer combination return to an in line condition, the shield member will be drawn back by the spring bias into the transverse position shown in FIG. 1.

In each of FIGS. 4 to 6, a trailer frame 1 having a body 2 and a hitch 3 is shown connected to the bumper 4 of an automobile 5 in the same manner as FIG. 1.

In FIG. 4, transverse support bracket 6 is provided which is constructionally identical to that of FIG. 3 except that it is of greater length in order to straddle the central portio, where it is secured. At each end, the support bracket 6 has pivoted thereto the inner end of a horizontal support arm 20, the inner ends of the support arms being identical in construction to those of the arms 9 of FIG. 3. Each of the arms 20 however extends through a right angle such that the outer end of the arm lies approximately transversely of the tow hitch 3.

A pair of shield plates 21 are mounted on square section stiffening tubes 22 which carry journal brackets 23 on their rear faces. The journal brackets 23 are pivotally mounted on the outer ends of the arms 20. Coil springs 24 are provided between the arms 20 and the stiffening tubes 22 to normally maintain the shield plates 21 at right angles to the arms 20 and generally in alignment with each other. The stiffening tubes 22 are provided with bumper contact members 25 which are identical in construction and mounting to the bumper contact members 17 of FIGS. 1 to 3.

In use, and assuming the automobile 5 to be making a turn to the left, the bumper 4 will bear against the bumper contact members 25 and rock the shield plate 21 together with the arm 20 rearwardly about the pivot provided in the bracket 6, generally as shown in broken lines. During this movement, the springs 24 deflect to allow the shield plate 21 to align with the bumper 4. When the vehicle reassumes an in line position with the trailer, the arm 20 returns to the position shown in FIG. 4 under the influence of the spring enclosed in the bracket 6 in the same manner as described above with reference to FIG. 1.

FIG. 5 shows a second embodiment according to the invention in which a transverse crossbar 30 is mounted on the trailer frame 1 forwardly of the body 2. At each end of the crossbar 30, a cylinder 31 is mounted parallel to the longitudinal axis of the trailer. Each cylinder 31 contains a coil spring bearing against the head 33 of a connecting rod 34 which extends through the front end 35 of the cylinder. The front end 35 is of reduced diameter so as to retain the head 33 within the cylinder. The front end 35 is also provided with a transverse bore 36 with which a corresponding bore 37 in the connecting rod can be aligned, a retaining pin 38 is also provided which is engageable through the bores 36 and 37 to retain the connecting rod in a retracted position against the bias of the spring 32.

A pair of shield plates 21 mounted on square section stiffening tubes 22 have journal brackets 23 pivoted to the leading ends of the connecting rods 34 in an identical manner to those of the construction of FIG. 4. Coil return springs 24 are also provided between the connecting rod and the stiffening tube to normally maintain the pair of shield plates 21 in transverse alignment. The stiffening tubes are also provided with vertically adjustable bumper contact members 25 as previously described with reference to FIG. 4.

In use, when the turning vehicle 5 commences a turn, the bumper 4 abuts the bumper contact members 25 on the side to which the turn is being made and causes rotation of the shield plate 21 about the pivot at the end of the connecting rod 34. The spring 32 is simultaneously subjected to compression as the connecting rod is forced rearwardly. As the vehicle and trailer return to an in line position subsequent to the turn, the spring 32 returns the connecting rod and shield plate to its original position whilst the springs 24 cause the shield plate to reassume its transversely aligned position.

FIG. 6 shows a third embodiment according to the invention. A curved cylinder 40 forming a segment of a circle is mounted on the frame 1. The cylinder 40 contains a coil spring 41 maintained under compression by the heads 42 provided at the rear ends of a pair of connecting rods 43. The ends 44 of the cylinder are of reduced diameter to retain the heads 42 within the cylinder. The ends 44 are also provided with transverse bores 45 with which corresponding transverse bores 36 in the piston rods can be aligned. Retaining pins 47 are provided which can be engaged with the bores 45 and 46 to retain the connecting rods 43 in a retracted position against the compression of spring 41.

A pair of shield plates 21 mounted on square section stiffening tubes 22 are pivoted by means of journal brackets 23 mounted on the stiffening tubes, to the leading ends of the connecting rods 43. The shield plates 21 are maintained in transverse alignment by means of coil springs 24 connected between the connecting rods 43 and the stiffenig tubes 22. Bumper contact members 25 are provided in the stiffening tubes in the same manner as described above with reference to FIGS. 4 and 5.

In use, when towing vehicle 5 commences a turn, the bumper 4 abuts the pair of bumper contact members 25 on the side to which the turn is being made so that the shield plate 21 is swung into alignment with the bumper. The connecting rod 43 is simultaneously moved rearwardly against the bias of spring 41. Upon return of the vehicle and trailer to an aligned position, the springs 41 and 24 cause return of the assembly to the position shown in FIG. 6.

It will be evident that in all of the arrangements proposed, each shield member can be separately mounted on the trailer and provided with separate spring biasing means for urging it into the forward position.

We claim:

1. A splash and stone shield assembly for a trailer body, comprising,
   at least one shield member,
   support means for mounting each shield member on a frame portion of the trailer forwardly of the trailer body and for movement relative to the trailer between a rearward retracted position and a forward shielding position, and
   resilient means for normally urging each shield member into the forward position.

2. A splash and stone shield assembly as claimed in claim 1 and further comprising a plurality of vertically adjustable bumper contact members and clamping means on said shield member for clamping said contact members in preselected positions for engagement with the bumper of the towing vehicle.

3. A splash and stone shield assembly as claimed in claim 1, and comprising a pair of shield members extending transversely of the trailer, substantially in alignment.

4. A splash and stone shield assembly for a trailer body as claimed in claim 3, and comprising a pair of shield plates each mounted on a horizontal support arm, a support bracket adapted to be mounted transversely on the trailer frame portion and having journals at each side in which the inner ends of said support arms are mounted for movement about vertical axes, said support brackets further comprising stops for limiting the forward movement of said shield plates and support arms from mutually aligned positions, and spring means biasing said support arms into engagement with said stops.

5. A splash and stone shield assembly as claimed in claim 4, wherein said spring means comprises a coil spring connected between said support arms forwardly of said journals.

6. A splash and stone shield assembly as claimed in claim 4, wherein said support bracket is formed at each side with apertures for receiving a retaining pin, and wherein said assembly further comprises retaining pins engageable in said apertures for retaining said shield members in their rearward positions.

7. A splash and stone shield assembly as claimed in claim 4, wherein said shield plates are pivotally mounted at the outer ends of said support arms, return spring means being provided whereby each shield plate and support arm are normally maintained at right angles, and wherein said support arms extend through an angle such that the shield plates lie in the same plane when in their forward positions.

8. A splash and stone shield as claimed in claim 1 and comprising a pair of shield plates, a pair of connecting rods each pivoted at one end to the rear face of a shield plate, return spring means normally maintaining the shield plates at right angles to said end of the connecting rods, cylinder means receiving and supporting the other end of each connecting rod, coil spring means biasing each connecting rod forwardly within the cylinder means to normally locate the shield plates in their aligned forward positions and means for mounting the cylinder means on the trailer frame.

9. A splash and stone shield assembly as claimed in claim 8, wherein said cylinder and connecting rods are provided with apertures which are aligned when the shield plates are in their rearward positions, and wherein said assembly further comprises retaining pins engageable in said apertures.

10. A splash and stone shield assembly as claimed in claim 9, wherein each connecting rod is received in a separate cylinder in axial abutment with a separate coil spring under compression.

11. A splash and stone shield assembly as claimed in claim 9, wherein the connecting rods are curved to conform with a segment of a circle, and wherein a correspondingly curved cylinder is provided having a coil spring therein, said connecting rods being received in opposite ends of said cylinder so as to be subjected to outward bias by said coil spring.

* * * * *